March 2, 1943.  C. R. WEISS ET AL  2,312,610
BELT CONVEYER IDLER
Filed June 10, 1941  2 Sheets-Sheet 1
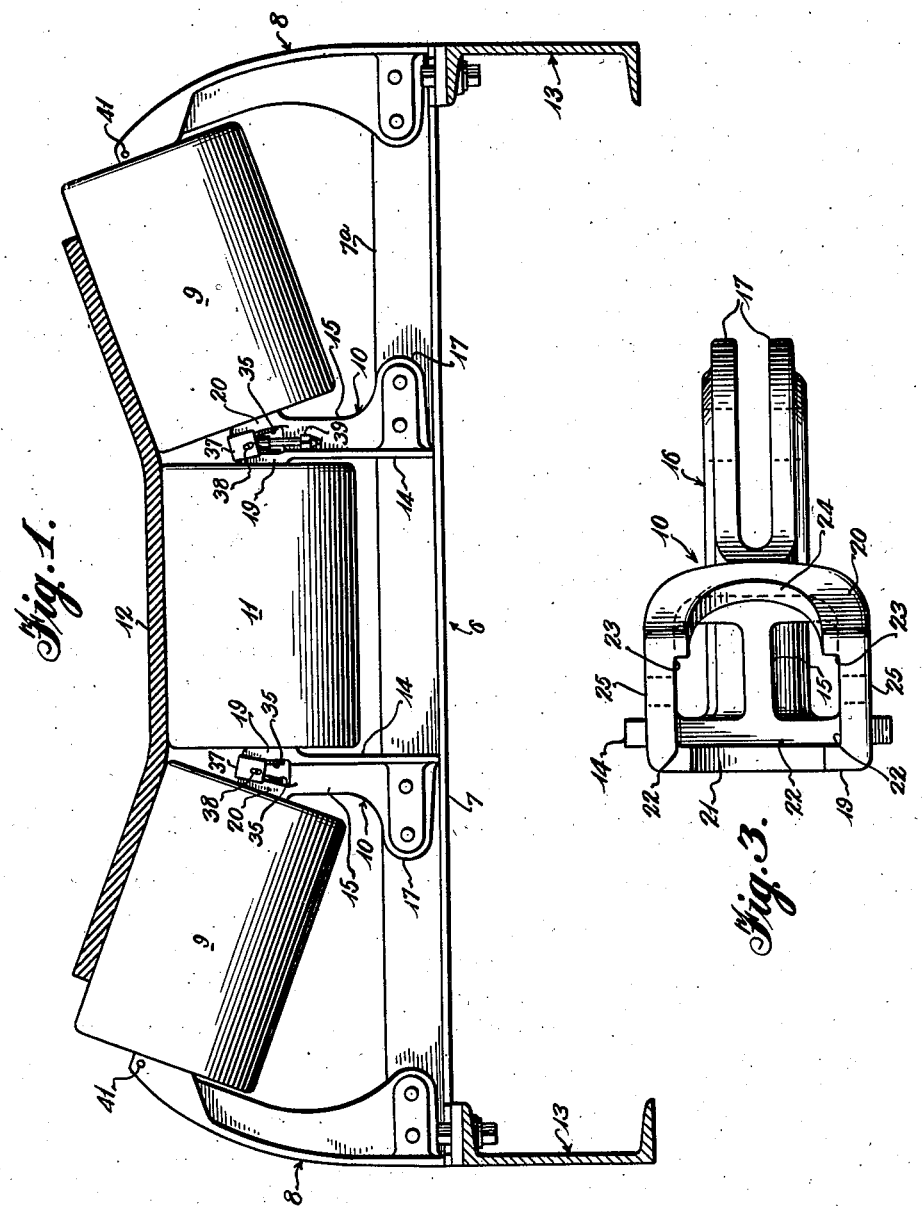
Inventors
Charles R. Weiss and
Richard W. Parker
By L. Donald Myers
Attorney

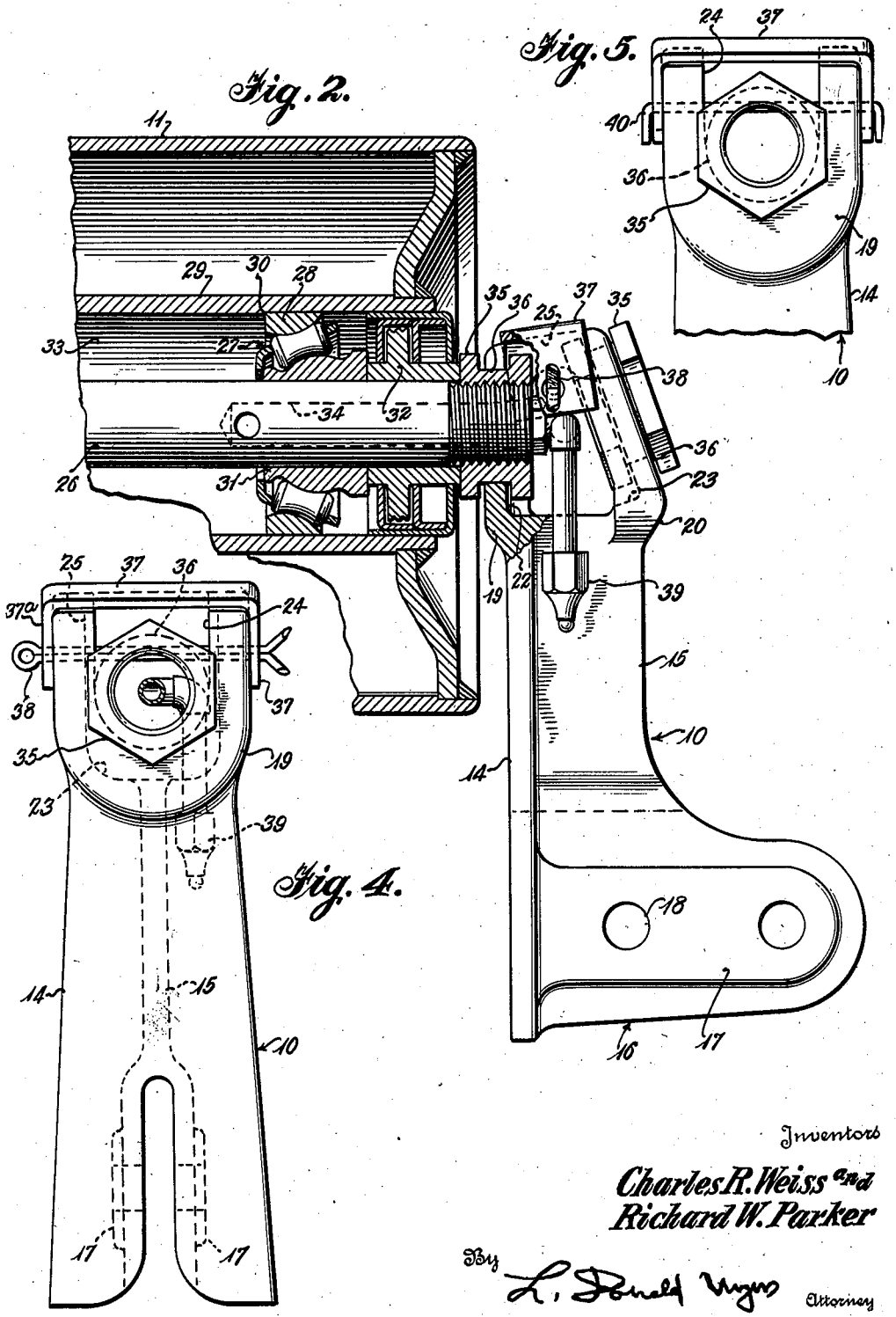

Patented Mar. 2, 1943

2,312,610

UNITED STATES PATENT OFFICE 2,312,610

BELT CONVEYER IDLER

Charles R. Weiss and Richard W. Parker, Indianapolis, Ind., assignors to Link-Belt Company, a corporation of Illinois Application June 10, 1941, Serial No. 397,474

4 Claims. (Cl. 308—20)

This invention relates to belt conveyer idlers and deals more specifically with new and useful improvements in the intermediate brackets which support adjacent ends of the angularly arranged rolls of troughing idlers.

It is the primary object of this invention to provide an improved form of intermediate bracket for troughing idlers of belt conveyers.

A further important object of the invention is to provide intermediate brackets for idler rolls which are so constructed that any one or more of the rolls may be dismantled in an improved manner without disturbing the remaining rolls or without requiring the entire idler to be removed from the frame of the conveyer.

Still another object of the invention is to provide improved means for retaining the rolls in place against accidental dislodgment both during shipment and while in service.

An additional object of the invention is to provide means for eliminating the possibility, during lubricating of the center roll, of the short grease pipe or fitting from being pushed up into contact with the moving belt and carried thereby to the other side of the idler. When an attendant applies grease to fitting by means of the conventional grease gun, a certain amount of pressure must be used to unseat the check valves, which normally seal the ends of the fitting and the gun, and to prevent leakage between the interfitting and coacting end portions of these two devices. A threaded connection is provided between the fitting and the roll shaft and if the fitting is not restrained in some way, the aforementioned pressure will cause a loosened fitting to be pushed up into engagement with the belt and, in being carried over to the other side of the idler, will puncture the belt.

More specific objects of the invention are to so construct the aforementioned roller assembly retaining means and the upper end portion of the bracket that materials spilled from the belt cannot enter and become lodged in the space around the ends of the roll shafts which are supported by the bracket and to so construct the upper end portion of the bracket that it will provide a substantial mounting for the anti-friction bearing adjusting nuts which are mounted on the short projecting end portions of the roll shafts.

Other objects and advantages of the invention will be apparent during the course of the following description.

In the accompanying drawings forming a part of this specification and in which like numerals are employed to designate like parts throughout the same, Figure 1 is an elevational view of a belt conveyor idler of the troughing type which includes the improved form of intermediate roll mounting bracket embodying this invention, Figure 2 is a detail, enlarged view, partly in vertical section and partly in elevation, of an intermediate bracket embodying this invention with a center roll shown associated therewith, Figure 3 is a detail, top plan view of one of the intermediate brackets embodying this invention with no other elements shown associated therewith, Figure 4 is an inner, side elevational view of an intermediate bracket with certain elements illustrated in Fig. 2 associated therewith, and Figure 5 is a detail elevational view disclosing the upper end portion of a bracket with a slightly modified form of securing element for the roll retaining clip.

In the drawings, wherein for the purpose of illustration are shown the preferred embodiments of this invention, and first particularly referring to Fig. 1, the reference character 6 designates in its entirety a troughing idler for a belt conveyer. This idler includes a base 7 which is of inverted, T-shape in vertical section. The outer ends of this base has suitably attached thereto the end brackets 8 which properly support the outer ends of the shafts, not shown, for the end rolls 9. Properly spaced along the base 7 are the two intermediate or center brackets 10, which specifically form the subject matter of this invention, and which support the inner ends of the shafts for the outer rolls 9 and both ends of the shaft for the center roll 11. These brackets 8 and 10 are so shaped that they will support the rolls 9 and 11 with their axes properly, angularly arranged to trough the belt 12.

Fig. 1 discloses the opposite end portions of the T-shaped base 7 as being properly attached to the parallel stringers 13 which form a part of the frame of the conveyer. Due to this manner of attaching the idler 6 to the stringers 13, the idler is of the fixed type. It will be appreciated, however, that the intermediate brackets 10, which specifically embody this invention, are intended to be used with self-aligning idlers as well as with the fixed type of idler specifically shown and for that reason the illustration of a fixed idler in Fig. 1 is not to be construed as limiting the use of these intermediate brackets. As self-aligning idlers are very common in the art, it should not be necessary to disclose the intermediate brackets assembled in one of the same.

One of the intermediate brackets 10 is shown in detail in Figs. 2 to 4 inclusive and will be specifically described in connection with these figures. It will be noted that the intermediate body portion of the bracket is of T-shape in transverse or horizontal section. This intermediate body portion, therefore, includes the side flange 14 and the center web 15. The foot or base 16 of the bracket is bifurcated or is formed of parallel, spaced parts 17 which are adapted to straddle the center web 7a of the idler base 7. Suitable openings 18 are provided in these spaced portions 17 to permit rivets, or the like, to be employed for attaching the bracket to the idler base.

The upper end of the main body portion of the bracket is integrally connected with the two forks 19 and 20. The fork 19 is but slightly offset inwardly of the flange 14 of the bracket. The fork 20 is inclined at a slight angle to the fork 19 and is attached to the upper, outer corner of the web 15. It will be appreciated, therefore, that the vertical loads borne by the fork 19 are applied directly to the flange 14 while the vertical loads borne by the inclined fork 20 are applied to the web 15.

The fork 19 is provided with a notch 21 which is shaped to provide parallel side edges and a curved or arcuate bottom edge. The arms and the base of this fork are rabbeted at 22 for a purpose to be explained at a later point. The rabbets of the arms of the fork provide parallel surfaces which are offset with respect to the parallel side edges of the notch 21. The rabbet for the bottom of the fork is spaced downwardly with respect to the bottom of the notch 21 and is really formed by the top edge of the flange 14 of the body portion of the bracket.

The fork 20, also, has its arms and its base rabbeted at 23 to provide parallel side surfaces which are offset with respect the parallel sides of the notch 24 of this fork. The bottom of the notch is curved or arcuate like the bottom of the notch 21. The bottom of the rabbet 23 is depressed below the curved bottom of the notch 24 and, as is clearly illustrated in Fig. 2, lies slightly above the top edge of the web 15 of the bracket.

Figs. 2 and 3 disclose reinforcing and bracing bars 25 which are formed integrally with and interconnect the side arms of the two forks 19 and 20. That is to say, each one of the bars 25 is connected with the arms of both of the forks which lie on one side of the vertical plane of the web 15. This manner of interconnecting or bracing the arms of the two forks materially strengthens these arms and causes all four of the arms to resist any end thrust applied to either fork by either roll which is supported by the bracket. These reinforcing and bracing bars 25 perform additional functions which will be explained at a later point.

In Fig. 2 the center roll 11 is illustrated as being supported on the roll shaft 26 by means of an anti-friction roller bearing unit 27. It will be understood, of course, that both ends of the roll 11 are supported on the shaft 26 by roller bearing units. These anti-friction bearings are of the combined radial and thrust type. Each outer race 28 is fitted in the steel tube 29 of the roll and is seated against an annular shoulder 30 formed in the bore thereof. The inner race 31 is engaged by the sleeve 32 of a labyrinth grease seal. These grease seals at the opposite ends of the steel tube 29 cooperate with the tube to form a lubricant reservoir 33 which is supplied with lubricant by the passage 34 formed in one end of the roll shaft 26.

A bearing adjusting nut 35 is threaded on the end of the roll shaft 26 and bears against the sleeve 32 of the labyrinth seal with the result that the nut functions to position and adjust the associated anti-friction roller bearing unit 27. By inspecting Figs. 2 and 4, it will be seen that the bearing adjusting nut 35 is provided with a central groove 36 which is formed with a cylindrical bottom. Both end portions of the nut, the portions lying on opposite sides of the center groove 36, are of hexagonal shape in end elevation, see Fig. 4. Each one of these end portions, therefore, is provided with three pairs of parallel side faces.

Fig. 2 discloses the bearing adjusting nut 35 for the center roll 11 as being positioned in the fork 19. The cylindrical central portion 36 of this nut is received within the notch 21 of the fork 19. The enlarged, hexagonally shaped end portions of this nut lie on opposite sides of the fork. The enlarged, hexagonal end portion which lies outermost with respect to the adjacent end of the roll 11 is fitted in the rabbeted part 22 of this fork 19. The adjusting nut 35 can only be dropped into the notch 21 of the fork 19 when one pair of parallel faces of its inner enlarged, hexagonal end are arranged in parallelism with the side surfaces of the rabbet 22. In other words, the enlarged hexagonal end portion of the nut fits in the rabbet 22 with two of its six side surfaces associated with the side surfaces of the rabbet 20 in such a manner that the nut is held against rotation with respect to the fork 19 of the bracket. The location of the enlarged, hexagonal end portions of the nut on opposite sides of the bracket 19 restrict axial movement of the roll 11 relative to the bracket 10 to the amount of clearance illustrated in Fig. 2.

With the opposite ends of the center roll shaft 26 supported by the two center or intermediate brackets 10 of Fig. 1, it will be appreciated that the forks 19 of these two brackets will cooperate with the two bearing adjusting nuts 35 to prevent rotation of these nuts and rotation of the shaft 26. The two forks, additionally, will provide adequate support for the short ends of the roll shaft 26 which project beyond the ends of the roll and which are enclosed within the nuts 35. Axial movement of the roll 11 will be permitted only to a limited extent by the cooperation of the adjusting nuts 35 with the forks 19. With the structure so far described, the roll 11 may be assembled with respect to the two center brackets 11 by merely dropping or fitting the adjusting nuts 35 into the notches 21 of the two bracket forks 19.

Fig. 2 discloses a bearing adjusting nut 35 fitted in the fork 20. This second adjusting nut 35 is of identical construction to the nut for the center roll 11 and cooperates with the parts of the fork 20 in identically the same manner as the center roll nut 35. This second nut is the bearing adjusting nut for the adjacent end of the outer roll 9 which is to be supported in part by the illustrated intermediate or center bracket shown in Fig. 2. The angular arrangement of the fork 20 results in supporting the associated outer roll 9 at an angle with respect to the center roll 11.

Figs. 1, 2 and 4 disclose U-shaped retainer clips 37 as being applied to the upper ends of the two center or intermediate brackets 10. These clips straddle the reinforcing and bracing bars 25 which interconnect the side arms of the forks 19 and 20. The clips, also, overlie the enlarged, hexagonally shaped end portions of the two adjusting nuts 35 which are supported by the two forks 19 and 20. To retain the clips 37 in place, Figs. 1, 2 and 4 disclose a cotter 38 which passes through apertures formed in the opposite, parallel end portions 37a of the clip. These apertures are so positioned that the cotter 38 will pass inwardly of the bracing bars 25 and will cooperate with these bars to hold the clip against accidental displacement.

Leaving these clips 37 for the moment, Figs. 1, 2 and 4 disclose a short grease pipe or Alemite fitting 39 which is of proper angular shape to be threaded at one end into the outer end of the grease passage 34 of the center roll shaft 26 and to extend outwardly and downwardly to terminate along one side of the bracket web 15. By means of this fitting and a suitable grease gun, grease may be forced into the lubricant reservoir 33 of the center roll 11. It, of course, is only necessary to provide such an Alemite fitting for one end of the center roll shaft 26. The shafts for the outer rolls 9 are provided with grease passages in their outer ends and suitable Alemite fittings are threaded in the extremities of these passages.

Returning now to the clips 37, it will be seen that they perform several functions. By overlying the inner, hexagonal end portions of the two adjusting nuts 35 supported by a bracket 10, the clip of that bracket holds the ends of both of the roll shafts assembled with respect to the bracket. The clips, therefore, overcome the need for banding the individual rolls to the idler frame for shipment. The clips, also, retain the rolls against displacement while the idler is in use. By bridging the space left between the forks 19 and 20, the clip 37 of each bracket 10 acts as a cover or roof which prevents foreign matters spilled from the conveyor belt from dropping into this space. Should any matter be thrown into the space between the forks and below the end edges of the ends 37a of the clip, this matter will not be retained or pocketed in the space due to the fact that the relatively thin, upper edge or end face of the bracket web 15 constitutes the only bottom wall of this intervening space. Each clip 37 performs the additional function of limiting the upward swinging movement of the Alemite fitting or short grease pipe 39 so that it is impossible for this fitting to engage the belt and be carried over to the opposite side of the idler. A fourth function performed by each clip 37 consists of reinforcing and bracing the interconnected side arm of the two forks 19 and 20. In other words, the bars 25 interconnect and brace the arms of the two forks and the clip functions to prevent spreading of the two pairs of fork arms which are connected by the bars 25.

Fig. 5 has been provided for the sole purpose of disclosing the possibility of employing a different type of securing means 40 for the clip 37. This securing means, instead of being a cotter, is a wire with its opposite end portions bent at right angles. Any other form of securing means may be provided which is capable of functioning to normally retain the clip in place but which can be removed easily and quickly to permit the associated clip to be disconnected from its bracket.

When it becomes necessary to replace a worn out or broken center roll 11 on the idler of Fig. 1, it only becomes necessary to remove the securing means 38 or 40 for the two clips 37, lift the clips off of the upper ends of the two intermediate or center brackets 10 and then lift the bearing adjusting nuts 35 at the opposite ends of the center roll 11 upwardly out of the forks 19 for the two brackets. The center roll then is dismantled with respect to the idler frame and a new center roll and shaft assembly may be substituted by reversing the procedure. When it is desired to replace an outer roll 9, it only becomes necessary to remove the clip 37 at the inner end of this roll and withdraw the retaining pin 41, see Fig. 1, which is passed through the end bracket 8 to retain the outer end of the said roll 9 connected to this end bracket.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, we claim:

1. In a belt conveyer idler, an intermediate bracket for supporting adjacent ends of roll shafts, said bracket having a pair of spaced forks formed on its upper end, a bar on each side of said forks for interconnecting the arms of the forks, a clip overlying the upper ends of the forks to straddle and rest upon said bars for preventing accidental displacement of the shaft ends, and means for detachably securing the clip to said bars.

2. In a belt conveyer idler, a bracket for supporting the adjacent ends of idler roll shafts, comprising a central body portion, a pair of spaced forks rising from the upper end of said body portion, said forks being notched to receive the ends of idler roll shafts, a reinforcing bar on each side of said forks for interconnecting the arms of the forks formed by said notches, a U-shaped clip bridging the space formed between the upper ends of the forks and the reinforcing bars and having its opposite sides lying outwardly of said bars, and a member passing through the opposite sides of the clip and beneath the reinforcing bars for securing the clip to said forks.

3. In a belt conveyer idler, a bracket for supporting the ends of idler roll shafts, comprising a central body portion of T-shape in horizontal section at its upper end portion, a fork rising from the upper end of the flange part of said body portion, a second flange rising from the upper and outer corner portion of the web part of said body portion, said forks being notched to receive the ends of idler roll shafts, the inner edges of the notches being rabbeted to accommodate portions of nuts on the ends of the roll shafts and to engage said nuts to prevent their rotation, bars connecting the arms of the two forks on the opposite sides of their notches, the spaced forks cooperating with the upper edge of the body web and each of the two bars to form side openings for the passage of a lubricant fitting connected to a roll shaft end, a clip overlying the upper ends of the forks to straddle and rest upon said bars for preventing accidental displacement of the shaft ends and providing protection for a lubricant fitting, and means for detachably securing the clip to said bars.

4. In a belt conveyer idler, a bracket for supporting the ends of idler roll shafts, comprising a central body portion of T-shape in horizontal section at its upper end portion, a fork rising from the upper end of the flange part of said body portion, a second fork rising from the upper and outer corner portion of the web part of said body portion, said forks being notched to receive the ends of idler roll shafts, the inner edges of the notches being rabbeted to accommodate portions of nuts on the ends of the roll shafts and to engage said nuts to prevent their rotation, bars connecting the arms of the two forks on the opposite sides of their notches, the spaced forks cooperating with the upper edge of the body web and each of the two bars to form side openings for the passage of a lubricant fitting connected to a roll shaft end, a U-shaped clip bridging the space formed between the upper ends of the forks and the bars and having its opposite sides lying outwardly of said bars for preventing accidental displacement of the shaft ends and providing protection for a lubricant fitting, and a member passing through the opposite sides of the clip and beneath the bars for securing the clip to said forks.

CHARLES R. WEISS.
RICHARD W. PARKER.